United States Patent [19]
Lawrence

[11] Patent Number: 5,865,580
[45] Date of Patent: Feb. 2, 1999

[54] FLEXIBLE AUTOMOTIVE CARGO BARRIER

[76] Inventor: Carl E Lawrence, 6990 Lake View Point, Longmont, Colo. 80503

[21] Appl. No.: 868,761
[22] Filed: Jun. 4, 1997

Related U.S. Application Data

[60] Provisional application No. 60/019,265, Jun. 7, 1996.
[51] Int. Cl.⁶ ...................................................... B60P 7/14
[52] U.S. Cl. .............................. 410/118; 410/94; 410/117; 410/129
[58] Field of Search ................................ 410/94, 95, 118, 410/117, 121, 129; 224/403, 500, 501, 526, 42.33, 42.34, 42.36, 542, 925; 296/37.5, 37.6, 39.2, 24.1; 248/354.1; 220/530, 531, 551

[56] References Cited

U.S. PATENT DOCUMENTS

| 4,226,348 | 10/1980 | Dottor et al. | 224/42.42 |
| 4,621,856 | 11/1986 | McKenzie | 296/24.1 |
| 4,770,579 | 9/1988 | Aksamit | 410/150 |
| 4,842,460 | 6/1989 | Schlesch | 410/121 |
| 4,941,784 | 7/1990 | Flament | 410/121 |
| 5,186,587 | 2/1993 | Moore | 410/118 |
| 5,234,116 | 8/1993 | Kristinsson et al. | 211/201 |
| 5,427,486 | 6/1995 | Green | 410/118 |
| 5,800,106 | 9/1998 | Miller | 410/117 |

FOREIGN PATENT DOCUMENTS 1166728  4/1964  Germany ............................ 248/354.1

Primary Examiner—Stephen T. Gordon
Attorney, Agent, or Firm—Louis G. Puls, Jr.

[57] ABSTRACT

A device for constraining cargo in a vehicle, the device having expandability, flexibility and portability. The extendibility embodies adjustments in barrier length to a short length for storage of the cargo barrier and adjustments in barrier length to fit the requirements of the cargo configuration. The flexibility embodies both horizontal and vertical deviations from a straight line configuration of the cargo barrier as a device to adapt to the cargo and cargo storage area configuration. The portability embodies a device for rapid deployment and removal of the cargo barrier.

5 Claims, 3 Drawing Sheets

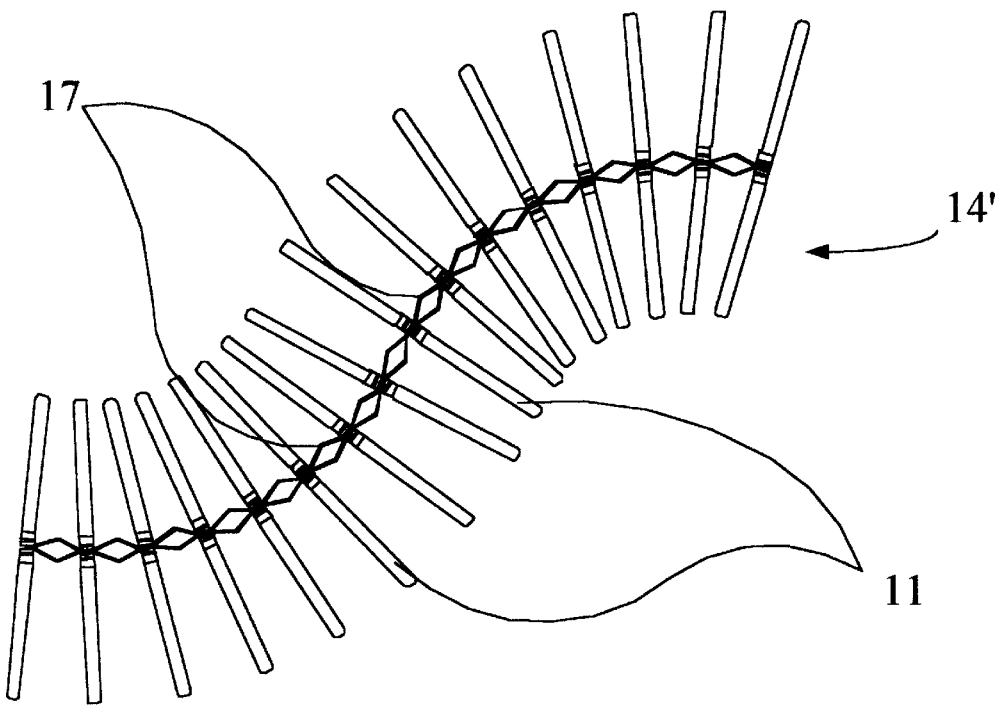
Fig. 5
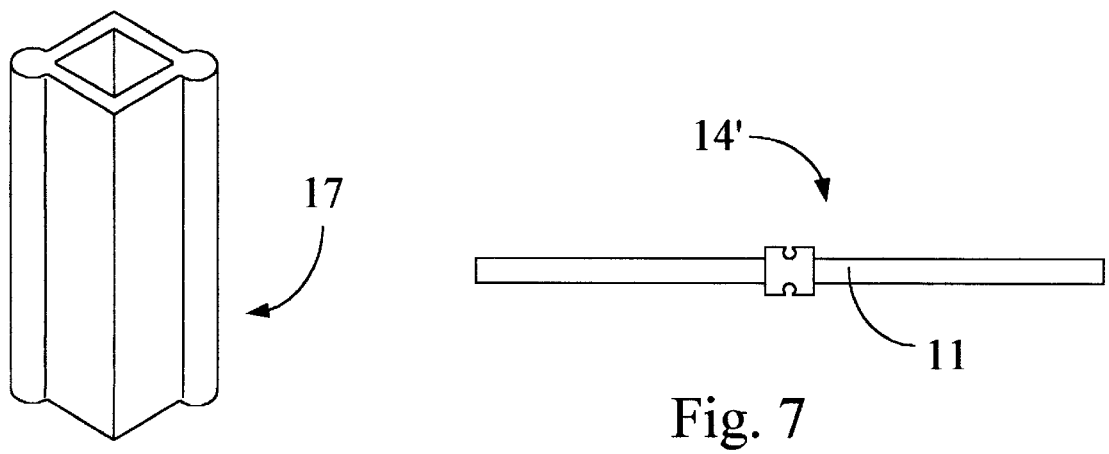
Fig. 6
Fig. 7

FLEXIBLE AUTOMOTIVE CARGO BARRIER

CROSS-REFERENCES TO RELATED APPLICATIONS

This is a Non-Provisional Application converting Provisional Application Ser. No. 60/019,265 filed 7 Jun. 1996.

BACKGROUND OF THE INVENTION

1. Field of the Invention

The invention relates generally to cargo barriers used in automotive vehicles, and specifically to an improved cargo barrier capable of rapid installation and easily changed spatial configuration.

2. Description of the Related Art

Within the related art are several cargo restraining devices for use in motor vehicles. All of these require some form of attachment to the vehicle, and the attendant inconvenience and lost time setting up the attachment. Additionally, there is no known related art of free-standing expandable functionality, allowing a rapid accommodation to the particular dimensions of cargo and cargo space. Of particular interest include the Automotive Barrier Net (U.S. Pat. No. 5,186,587; Moore), simply a net that is fastened between the inside walls of the vehicle to separate the trunk area from the passenger area. The Mountable and Demountable Partition Structure for Motor Vehicles (U.S. Pat. No. 4,621,856; McKenzie) is an adjustable rigid partition fastened to the walls, floor and ceiling of a vehicle cargo area. The Automobile Trunk Contained Grocery Bag Holder (U.S. Pat. No. 4,226,348; Dotter and Dotter) is a collapsible device fastened to the trunk floor and expandable into a multiple of grocery bag sized compartments. The foregoing related art include no embodiments that are functionally free-standing yet expandable.

SUMMARY OF THE INVENTION

The present invention provides a portable cargo barrier for use in automobile trunks, mini-vans, sport utility vehicles, and other vehicles provided with similarly usable cargo space. The invention is adjustably installed in the cargo area in such a manner as to allow for placement of the cargo between said invention and a wall, door, seat or other stationary object in the vehicle. The invention provides a vertical wall to support cargo that may tend to tilt over, as well as to keep cargo from sliding, slipping or rolling during vehicle movement. The vertical wall of the invention is supported by a base comprised of opposed outrigger members. The outrigger members are wide enough to keep the vertical wall section upright against moderate to heavy forces from the cargo during vehicle movement. Each outrigger member is flat on the top to allow for cargo to sit close to said vertical wall. The underside of the outrigger members have a multiple number of conically-shaped protrusions to grip for example carpet of the vehicle cargo area. During installation, the invention may be lengthened and fitted to a curve to adapt to the cargo.

Accordingly, two objects and advantages of the invention are portability and ease of installation. The invention is simply hand carried from vehicle to vehicle as needed. It is easily installed by extending the invention to the desired length and placing it in the appropriate location. The cargo is then placed between the invention and a wall of the vehicle, and, where required, onto the horizontal outrigger members of said invention.

An additional object of the invention is to provide a cargo barrier having a high degree of length adjustment. This invention can be collapsed to a portion of its fully extended length for storage. Additionally, said length adjustment allows great versatility in fitting the invention to different size cargo areas and for providing a barrier for different sizes and quantities of cargo.

It is a further object of this invention to provide a cargo barrier having great horizontal flexibility to conform to the shape and/or location of the cargo to be restrained.

It is a still further object of the invention to provide a cargo barrier having vertical and horizontal stability through horizontal outrigger members, also allowing for the cargo to be placed on top of said outrigger members in such a manner as to increase the stability of invention to a greater degree.

It is an additional still further object of the invention to provide a cargo barrier having horizontal outrigger members with protrusions on the lower surfaces of said outrigger members to increase the invention's resistance to sliding, stabilizing the cargo against slippage.

Still further objects and advantages will become apparent from a consideration of the ensuing description in conjunction with the accompanying drawings of a preferred embodiment of the invention.

BRIEF DESCRIPTION OF THE DRAWINGS

FIG. 5 is a plan view of an embodiment utilizing a connecting piece as the connecting means between segments.

FIG. 6 is a perspective view of a connecting piece of FIG. 5.

FIG. 7 is a top view of a segment of FIG. 5.

DESCRIPTION OF THE PREFERRED EMBODIMENTS

To fully illustrate the scope of this invention, two forms of preferred embodiment will be described. The first embodiment of the invention is a form such as can be fabricated from injection molded segments of synthetic material. In this case, each segment 14 of a barrier fence 10 is snap-fitted to the next identical segment 14. In the second embodiment, the invention is fabricated with a flexible material interconnecting rigid segments 14' of the invention.

Figure 1:
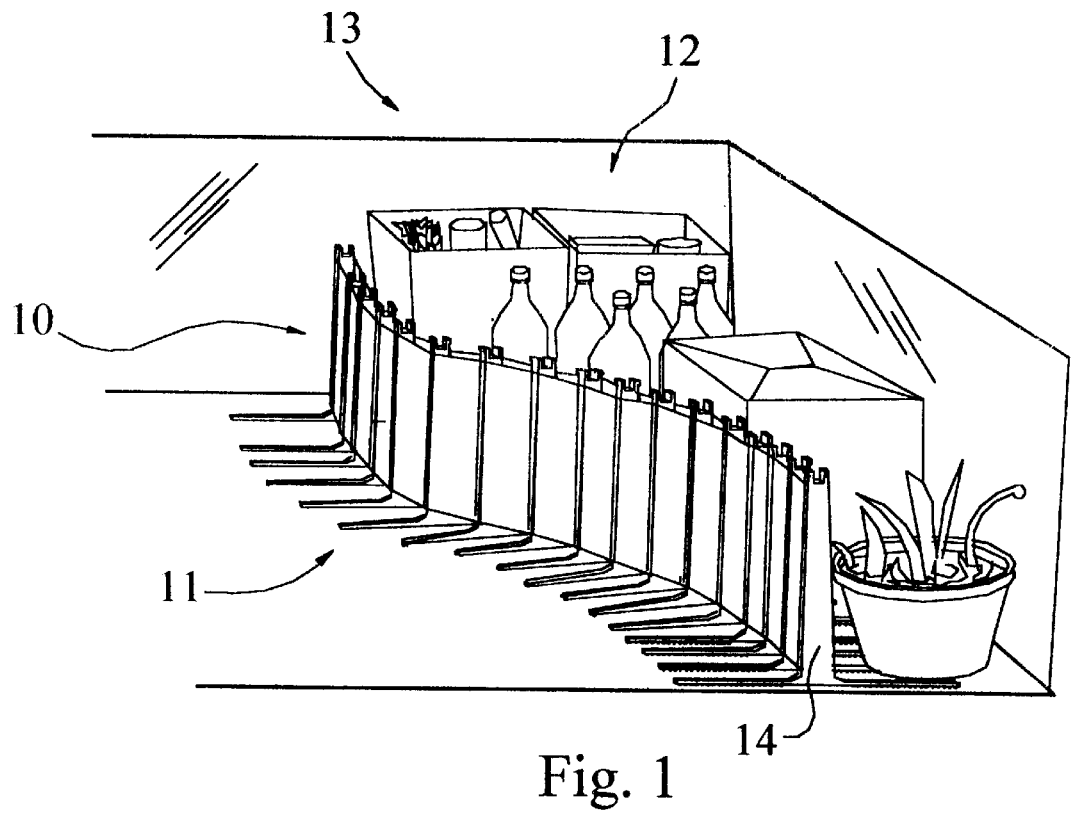
FIG. 1 is a perspective view of a preferred embodiment as used to restrain cargo.

Shown in FIG. 1 is a perspective view of the invention as it may be configured to retain and restrain cargo 12 to one side of a cargo area 13 with at least one side wall. In this configuration the invention has been extended and aligned to provide a closely fitting barrier to a cargo 12. The cargo 12 is restrained by both the invention and the sides of the cargo area 13 of a transporting vehicle.

The primary portions of each segment 14 of the invention include a vertical portion or fence 10, and a horizontal portion or outrigger members 11. The fence 10 provides the actual barrier to the sliding, slipping or tilting of the cargo 12. The outrigger members 11 provide positional stability to the fence 10. As shown here, the cargo 12 can be placed on top of the outrigger members 11, and thus increase the positional stability of the invention.

As embodied in FIG. 1, the invention is made up of a multiplicity of segments 14. Each segment 14 is comprised of a fence 10 portion and two opposed outrigger members 11. The segments 14 are attached to each other with a system that allows each segment 14 to slide closer to each adjacent segment 14 and also allows each segment 14 to articulate in horizontal and vertical planes intersecting the linear axes of the adjacent segments 14.

Figure 2:
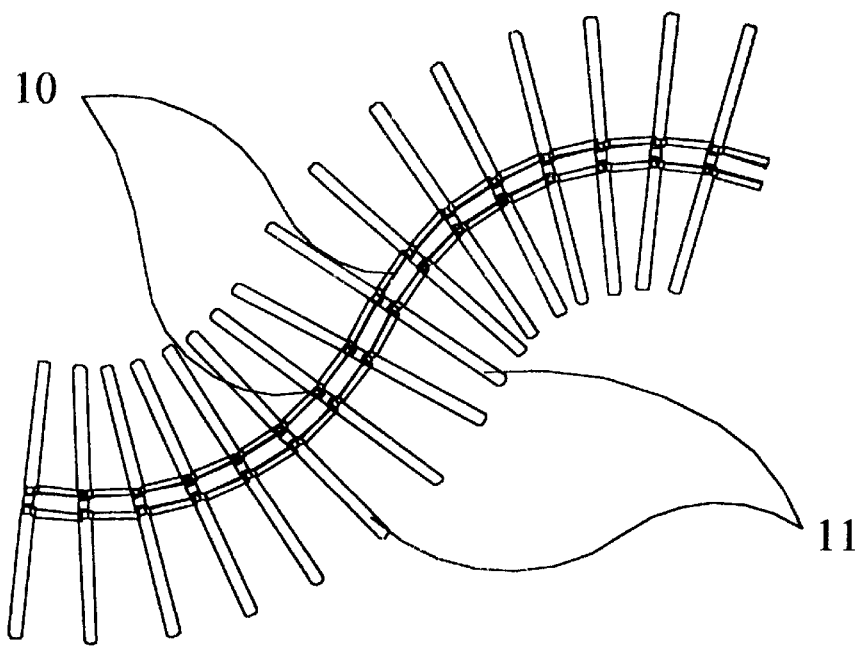
FIG. 2 is a plan view of the preferred embodiment illustrating the horizontal flexibility and outrigger members.

FIG. 2 is an illustration of a top view of the invention. This installed configuration is similar to the layout as shown in perspective in FIG. 1. As shown in this view, outrigger members 11 extend out from both sides of the vertical fence 10 portion. It can be seen from this view that the conjoining linear axes of the segments 14 of the invention will follow a horizontal curve to adapt to the needs of the cargo 12 or the cargo area 13 of the vehicle.

Figure 3:
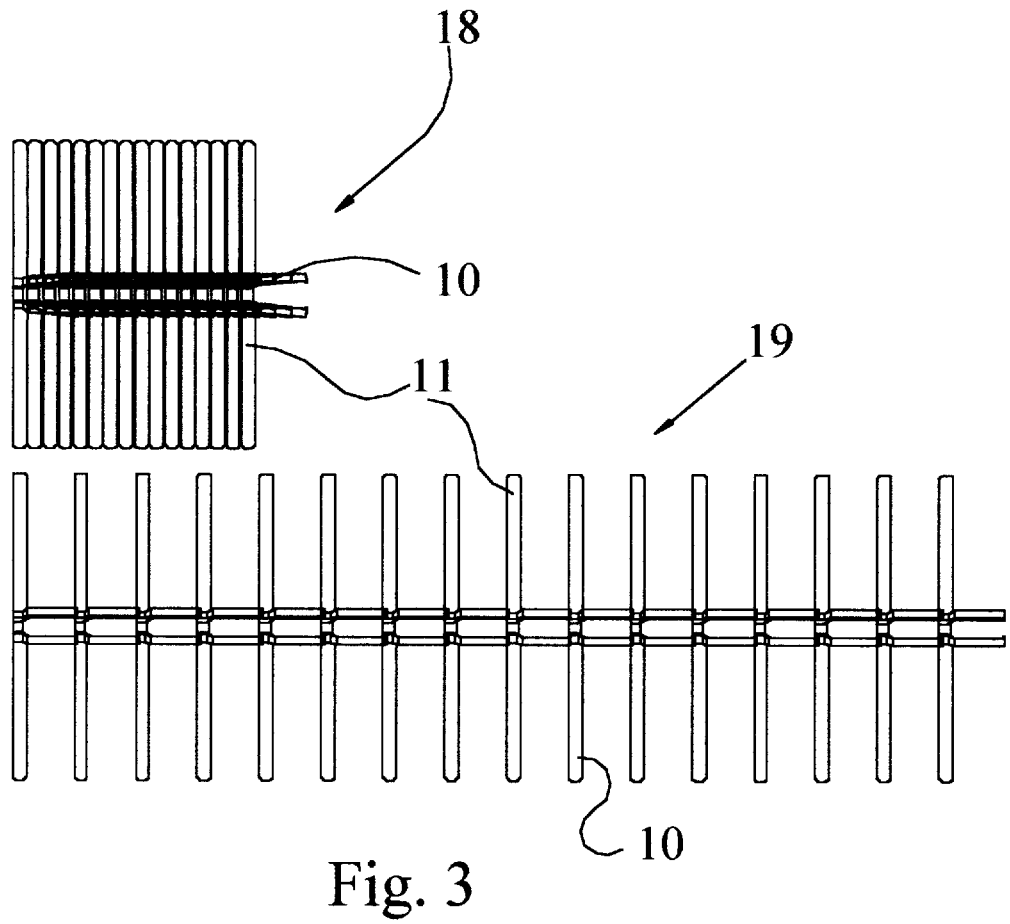
FIG. 3 is a plan view of the preferred embodiment highlighting the collapsibility of the invention.

In FIG. 3, the extension property of the invention is shown. In this embodiment, the fully extended configuration 19 of the invention is approximately four times the length of the fully compressed configuration 18 of the invention. The fully compressed configuration 18 is employed to store the invention when not in use. This allows the invention to be stored in a small volume.

A second purpose of the extenson property of the invention is to allow the invention's configuration length to be adjusted to better fit the cargo area 13. In this manner, the configuration length can be adjusted to any dimension from the fully extended 19 configuration to the fully compressed configuration 18 to adapt to the needs of the cargo 12 restraining requirements.

Figure 4:
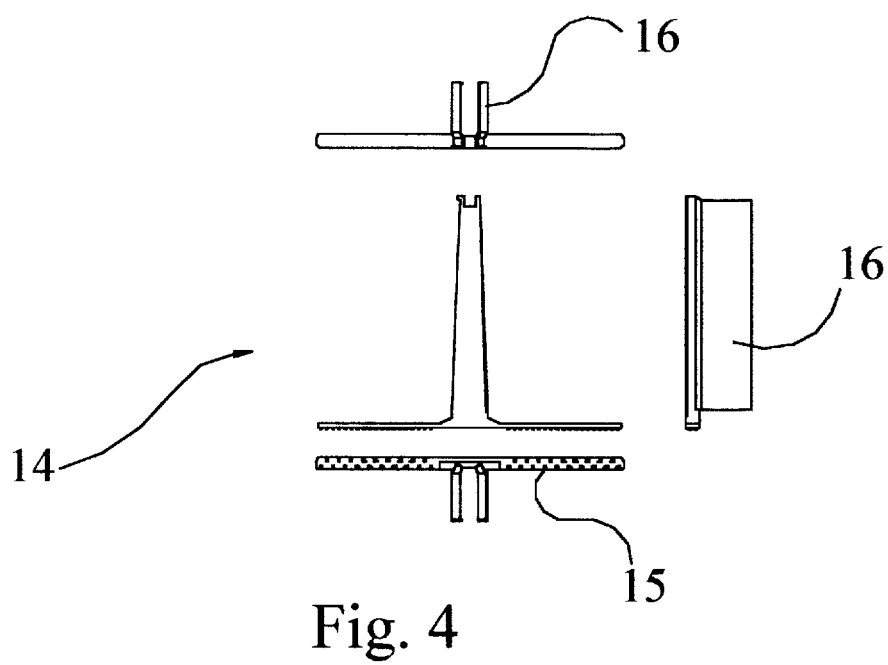
FIG. 4 is a detail illustration of the preferred embodiment of one segment of the invention.

FIG. 4 illustrates an individual segment 14 of the first form of the preferred embodiment of the invention. Each "inverted T" segment 14 may be for example injection molded from standard polymer material. The vertical fence 10 portion is well supported by the outrigger members 11 with relatively large radii in the filleted corners between the fence 10 portion and the outrigger members 11. The outrigger members 11 are flat and reasonably thin to allow for placement of the cargo 12 on top of said outrigger members 11. Protruding from the bottom of each outrigger member 11 is a multiplicity of conically-shaped protrusions 15, which function to resist the slippage of the invention, such as across carpeted or resilient cargo area 13 floors. With the additional downward force from the weight of the cargo 12 placed on the outrigger members 11, the conically-shaped protrusions 15 will secure the invention from slipping to an even greater degree than that experienced without the weight of the cargo 12.

On one side of the vertical portion of each segment 14 of the invention is a connecting portion 16. The connecting portion 16 provides a snap-fitting function for each of the successive and adjacent segments 14 that comprise the invention. In addition to snap-fitting together the segments 14, the connecting portion 16 provides a sliding action used in extending and compressing the configuration length of the invention. Each successive and adjacent segment 14 is captively constrained to slide with respect to the adjacent segment 14 in such a manner as to affect the configuration length of the invention and to allow for changing the articulation angle of each segment 14 with respect to the adjacent segment 14. Through this action this embodiment of the invention is adaptively configured to curves in both the horizontal and vertical direction.

FIG. 5 is an illustration of the second form of the preferred embodiment of the invention. The overall arrangement of the vertical fence 10 and the outrigger members 11 is the same as that found in the first embodiment as shown in FIG. 2. The difference between the first embodiment and the second embodiment, described here, can be found in the interconnection of the successive segments, here 14'. In this embodiment, the segments 14' are connected via a flexible and compressible "accordion"-form connecting piece 17. Whereas segment interconnection in the first embodiment is carried out by means of the integral connecting portion 16, in the second embodiment it is carried out by means of the separate and intermediate connecting piece 17. The accordion-form connecting piece 17 provides the lateral strength and stability between the segments 14' and has sufficient flexibility for changes in the articulation angles, both vertical and horizontal, between successive and adjacent segments 14'. In operation, this embodiment maintains the extendibility and flexibility of the first embodiment, provided to have approximately the same four-fold compression ratio. Connection to adjacent segments 14' is preferably implemented with key and slot interlocking portions along the full lengths of the connecting piece 17 and segments 14', formed thereon such as through injection molding, as illustrated in FIGS. 6 and 7.

Preferred Embodiment

Operation

In an anticipated operation of the invention, the invention is stored in a compressed configuration 18 until needed. The invention may be stored within the transporting vehicle or at some other location as required.

The invention is first applied in the user determining the approximate shape and location of the cargo 12 to be restrained. The user, by gripping the ends of the invention, will then extend the length of the invention to the estimated requirements and place the invention in the cargo area 13. The user will then form and position any horizontal curves in the invention to align said invention with the predetermined approximated shape and location of the cargo 12. After the invention is positioned to the user's satisfaction, the cargo 12 is then placed between the invention and at least one wall of the cargo area 13 or some other barrier. Some or all of the cargo 12 will be placed on the outrigger members 11 of the invention.

If at any point during the placement of the invention or cargo 12 the user determines the invention is not in the best position to restrain the cargo 12, the user may simply lift up slightly on the invention and reposition it. Once the cargo 12 is placed on the outrigger members 11, its weight may have to be removed from the outrigger members 11 in order to reposition the invention. In some situations cargo 12 may be placed on both sides of the invention.

Upon completion of the task of transporting the cargo 12, and after the removal of the cargo 12, the invention can be lifted from the cargo area 13 and compressed to its shortest configuration 18 for storage.

Conclusions, Ramifications, and Scope

Accordingly, it can be seen that the invention will be of benefit in the constraint of cargo in motor vehicles. In situations where the cargo area is reasonably flat, there is a great likelihood that some cargo will slide or roll around during the driving. In utilizing the invention in a very straight forward and easily installed fashion, a driver will no longer need to be concerned about the condition of the cargo. The peace of mind achieved with the use of the invention can lead to safer and more relaxed drivers, and ultimately to a safer driving environment for the general public.

The invention can be used in sedans, station wagons, sports utility vehicles, mini vans, motorhomes and full-size vans. However, use of this invention is not envisioned to be limited to these vehicles. Some users may also find a need for the invention in further carriers such as boats, planes, trailers, or in the beds of pickup trucks.

Although the description above contains many specificities, these should not be construed as limiting the scope of the present invention, but rather as merely providing illustrations of some of the presently preferred embodiments of this invention. Various other embodiments and ramifications are possible within the scope of the invention. For example, the invention could be fabricated from a metal and used in harsher environments. Or, magnets could be placed in the outrigger members to stabilize the invention on certain metal surfaces.

Thus the scope of the invention should be determined by the appended claims and their legal equivalents, rather than by the examples given.

What is claimed is:

1. A cargo retaining barrier for cargo receiving vehicles having a storage area with one or more retaining walls and floor and used for various cargo configurations, said cargo retaining barrier comprising:

a segmented and articulated fence comprised of integral segments with supporting outrigger members, said integral segments interconnected by articulated connection means, and said articulated connection means including joints providing extensible and flexible articulation within the cargo retention area of the fence.

2. A cargo retaining barrier as set forth in claim 1 wherein said connection means comprises slidably and adjustably engaging snap-fitting joints providing adjustment ranging from a fully collapsed configuration to a fully extended configuration.

3. A cargo retaining barrier as in claim 2 wherein said fully collapsed configuration is compactly portable and storable.

4. A cargo retaining barrier as in claim 2 wherein said fully extended configuration is highly flexible in both horizontal and verticle deviations from its linear axis, providing spatial adaptation of the barrier for effective retention of the cargo in its storage area configuration, with said outrigger members including stabilization against cargo slippage by means of conically-shaped protrusions contacting the storage area floor.

5. A cargo retaining barrier as set forth in claim 1 wherein said connection means comprises accordian-form connection pieces, discrete from but interconnected with said integral segments, providing extensible and flexible joint articulaton and adjustment ranging from a fully collapsed configuration to a fully extended configuration.

* * * * *